United States Patent [19]

Eilers

[11] Patent Number: 4,993,733

[45] Date of Patent: Feb. 19, 1991

[54] THREE WHEELED RECUMBENT CYCLE

[76] Inventor: Keith Eilers, 138 Crest Haven, Belleville, Ill. 62221

[21] Appl. No.: 312,909

[22] Filed: Feb. 21, 1989

[51] Int. Cl.$^5$ .............................................. B62K 5/04
[52] U.S. Cl. .................................. 280/261; 280/267; 280/282
[58] Field of Search ...................... 280/261, 282, 288.1, 280/240, 267, 268

[56] References Cited

U.S. PATENT DOCUMENTS

| | | | |
|---|---|---|---|
| 381,763 | 4/1888 | Dearlove et al. | 280/282 |
| 406,445 | 7/1889 | Jeffery | 280/261 |
| 3,920,263 | 11/1975 | Bundschuh | 280/267 |
| 4,283,070 | 8/1981 | Forrestall et al. | 280/288.1 |
| 4,410,198 | 10/1983 | Fernandes et al. | 280/282 |

FOREIGN PATENT DOCUMENTS 103479  3/1938  Australia ....................... 280/288.1

Primary Examiner—Richard A. Bertsch
Assistant Examiner—A. M. Boehler
Attorney, Agent, or Firm—Gravely, Lieder & Woodruff

[57] ABSTRACT

A three wheel recumbent vehicle having the steering pivot point of the front axle tilted forwardly about 8° from perpendicular, causing the vehicle from the pivot point back to lean into a turn, and also having the front axle bar constructed with a low center section and end members which radiate upwardly and backwardly to provide room for the user's feet and to add stability on turns by increasing the distance between the center line of the vehicle and the point where the outboard tire touches the road.

5 Claims, 3 Drawing Sheets

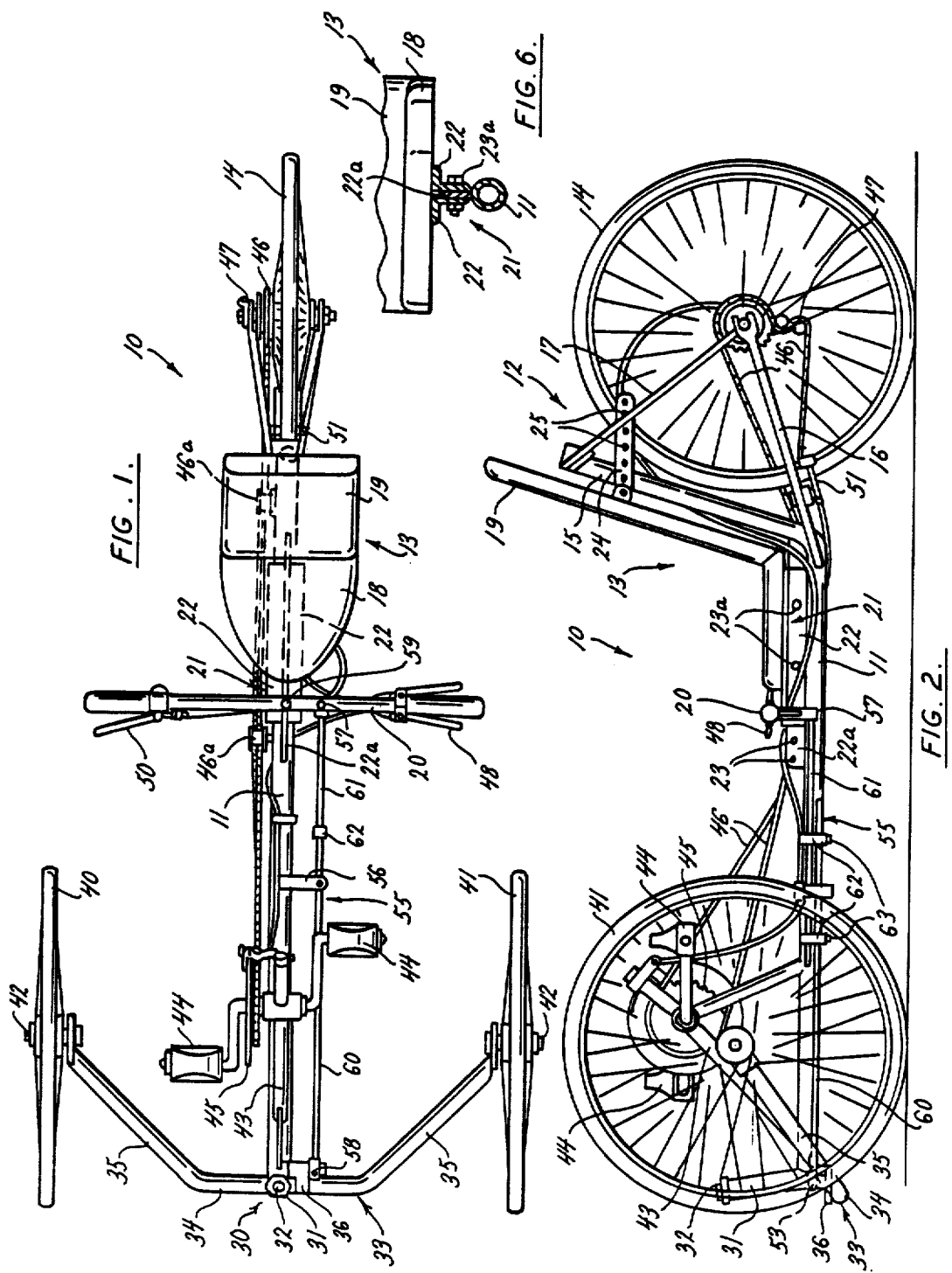

THREE WHEELED RECUMBENT CYCLE

BACKGROUND OF THE INVENTION

This invention relates to a recumbent vehicle and particularly relates to a three wheel vehicle having a single rear drive wheel and a pair of opposed front steering wheels.

A principal object of this invention is to provide a three wheel recumbent cycle which is stable on turns. Another object is to provide a three wheel recumbent vehicle in which the steering pivot point of the pivotably steerable front axle is not vertically perpendicular to the horizontal frame, but is at about a 98° angle, i.e., tilted about 8° forwardly from perpendicular. This causes the vehicle, from the pivot point back, to lean into a turn, thus increasing anti-rollover stability on turns.

Still another object is to provide a three wheel recumbent vehicle having a front axle bar which has a center section which is low where it connects to the pivot point and which has end members which radiate upwardly and backwardly toward the rider. This has the dual advantages of providing more room for the rider's feet to drive the pedals and of adding stability on turning by increasing the distance between the center line of the vehicle and the point where the outboard tire touches the road.

These and other objects and advantages will become apparent hereinafter.

SUMMARY OF THE INVENTION

The invention comprises a three wheel recumbent vehicle which has added stability in turns.

The invention also consists in the parts and in the arrangements and combinations of parts hereinafter described and claimed.

In the accompanying drawings which form part of the specification and wherein like numerals and letters refer to like parts wherever they occur.

DESCRIPTION OF THE DRAWINGS

FIG. 1 is a top plan view partly in detail of the three wheel vehicle of this invention;

FIG. 2 is a side elevational view of the three wheel vehicle of this invention;

FIG. 6 is a fragmentary sectional view of the seat adjustment assembly.

DETAILED DESCRIPTION

Figure 3:
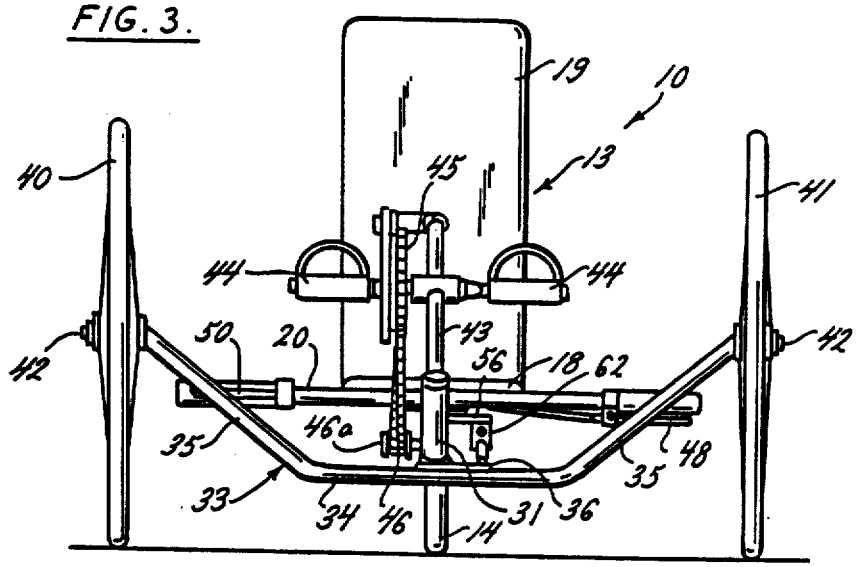
FIG. 3 is a front elevational view of the vehicle of FIG. 1.

FIGS. 1, 2 and 3 show the recumbent three wheel cycle 10 of this invention which comprises a main longitudinal frame member 11 which preferably is a hollow tubular member. Attached to the back end of the main frame 11 is a triangular bracket 12 which supports a seat assembly 13 and a rear drive wheel 14. The bracket 12 includes a rearwardly inclined seat support 15, spaced rearwardly extending wheel axle supports 16, and spaced connecting members 17 which connect the free ends of the seat support 15 and the wheel axle supports 16.

The seat assembly 13 includes a horizontal seat member 18, a rearwardly inclined back support 19, a pivotably steering bar 20, and a longitudinal adjustment assembly 21 for slidably adjusting the seat assembly 13 along the main frame 11. The adjustment assembly 21 (FIG. 6) includes brackets 22 positioned on the bottom of the horizontal seat member 18, and a plate 22a fastened to the top of the main frame 11. The brackets 22 are provided with openings 23 aligned with similar openings in plate 22a. Suitable retainers 23a, such as bolts and nuts, position the seat assembly in a desired location (dependent on the user's height and leg length) with respect to the main frame 11.

The back support 19 is similarly movable with respect to the seat supports 15. A bracket 24 with openings 25 is fastened to the seat back support 19 and is adjustably fastened to the seat support 15.

At the front end of the main frame 11 is an angularly inclined pivot mechanism 30. The pivot mechanism 30 includes an outer shell 31 welded to the main frame 11 and an inner rotatable member 32 which is supported inside the shell 31 by races of bearings (not shown).

Figure 5:
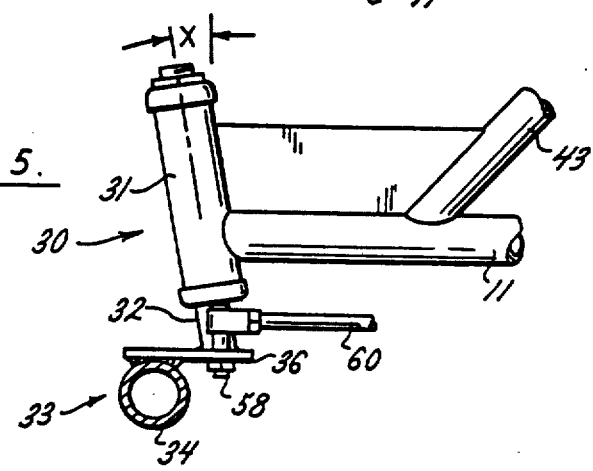
FIG. 5 is a fragmentary vertical sectional view of the front pivot area of the steering mechanism.

Fastened to the rotatable member 32 is the front axle 33 which is composed of a central lower member 34 and rearwardly and upwardly inclined end members 35. The front axle 33 is connected to the rotatable member 32 by a bracket 36 which rotates with the front axle 33. The steering pivot point of the front axle 33 is not perpendicular to the horizontal frame 11, but it is at about a 96°-98° angle ("X" in FIG. 5) to the horizontal. In other words, it is tilted about 6°-8° forward. This makes the cycle from the pivot point back lean toward the turn side to add anti-rollover stability. When the vehicle is turned left, the vehicle leans left and vice-versa when turned right. The inclined steering post causes the outside wheel in a turn to be lowered and the inside wheel to be raised. Because of the contour of the road, the result is to add thrust against the outside to force the cycle into the turn and resist overturning in opposition to the centrifugal force of the turn.

The front axle bar 33 is made with the lower center section 34 radiating backwardly, outwardly, and upwardly into the end sections 35 for two reasons. The first is that this configuration gives room for the rider's feet and heels to pedal the cycle without interfering with the axle center section 34. It also gives the rider room to steer the cycle without interference with the center axle bar 34. The second reason for the outward and backward angle of the axle 33 is to give the vehicle added anti-rollover stability. This also neutralizes the steering, in the same fashion as the dihedral angle of an airplane wing makes the plane level out to straight flight after a turn.

Figure 4:
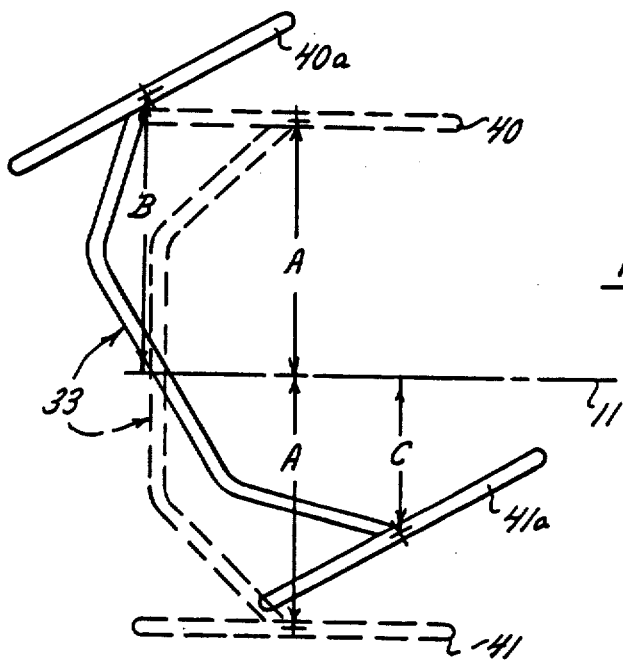
FIG. 4 is a schematic view of the steering assembly in a left turn.

To illustrate how the vehicle is stabilized in a turn, refer to FIG. 4. When the vehicle is headed straight, the points where the front wheels 40 and 41 tough the ground and their distances from the center line of the frame 11 are represented by the distances "A" and "A" and are equal. As the vehicle turns left, the right wheel 40 moves to the position 40a, so that the point where the wheel touches the ground is represented by the distance "B" which is greater than distance "A". At the same time, the left wheel 41 moves to position 41a. The distance between the position where the left wheel touches the ground and the vehicle center line is represented by the letter "C" and is less than the distance "A". In other words, the outer wheel 40 acts as an outrigger to stabilize the vehicle as it turns and to resist the centrifugal force of the turn.

The wheels 40 and 41 are rotatably journaled to the free ends of the axle 33 by rods 42.

Mounted on the center frame 11 by supports 43 are drive means including pedals 44 which drive a sprocket 45 which operates a drive chain 46. The chain 46 is connected and directed to the rear drive wheel 14 through two idler gears 46a positioned beneath the seat 18 to a gear reduction unit 47 to provide a 10 speed, 5 speed, or other type of geared cycle drive. The gear shift lever 48 preferably is attached to the steering bar 20, but can be located in other places on the frame 11.

Also positioned on the steering bar 20 is a brake actuator 50 which is connected to convention bicycle wheel brakes 51 mounted on the connecting frame members 16 to engage the rear wheel 14.

The steering bar 20 is connected to the front axle by a push rod 55 which is supported on the main frame 11 by a bracket 56 and is pivotally connected at 57 and 58 to the steering bar 20 and the front axle center section 34, respectively. The steering bar 20 itself is pivotally mounted on the seat adjustment assembly 21 at the pivot point 59 so that it moves with the seat 18 and 19.

The push rod 55 is made in two sections 60 and 61 which overlap to allow the length of the push rod 55 to be adjusted depending on the location of the seat 13. The front rod section 60 is connected to the axle 33 and the rear section 61 is connected to the steering bar 20. They both pass through openings in clamp blocks 62 and are held there by set screws 63. The clamp blocks 62 align and retain the rod sections 60 and 61.

This invention is intended to cover all changes and modifications of the example of the invention herein chosen for purposes of the disclosure which do not constitute departures from the spirit and scope of the invention.

What is claimed is:

1. A recumbent vehicle comprising
  a. a main longitudinal frame,
  b. a seat assembly positioned on the frame,
  c. a rear drive wheel mounted on the rear end of said frame,
  d. a front steering mechanism mounted on the front end of said frame comprising,
    1. a front axle having a lower center axle member to provide room for the rider's feet to pedal the vehicle and rearwardly and upwardly inclined end members.
    2. a steering post, being forwardly inclined and having a connection to the frame said center axle member being pivotally mounted to said steering post below the connection of said steering post to the frame, whereby the entire axle pivots about the steering post when the vehicle is turned,
    3. a pair of front wheels journaled on the ends of said axle end members,
    4. a pivotable steering bar mounted on the frame, and
    5. a steering push rod directly connecting the center axle member and the steering bar and supported by the main frame to pivot the axle member when the steering bar is turned,
    6. said front steering mechanism providing the vehicle anti-rollover stability when the steering bar is turned thereby pivoting the entire axle about the steering post thus increasing the distance between where the outer wheel touches the ground and the center line of the vehicle and decreasing the distance between the vehicle center line and where the inner wheel touches the ground during a turn, and
  e. drive means mounted on the main frame including a pedal means engagible by the feet of the driver and drive chains connected between the pedal means and the rear drive wheel.

2. The vehicle of claim 1 wherein the steering post is inclined from about 96° to about 98° to the horizontal.

3. The vehicle of claim 1, wherein the seat is longitudinally adjustable along the length of the frame.

4. The vehicle of claim 1 wherein the connecting rod is adjustable in length and the steering bar and the seat are longitudinally adjustable along the length of the frame.

5. The vehicle of claim 1, wherein the steering bar has actuators for a gear shift and brake system for the vehicle.

* * * * *